No. 805,054. PATENTED NOV. 21, 1905.
I. W. COLBURN.
GLASS WORKING APPARATUS.
APPLICATION FILED OCT. 1, 1903.

UNITED STATES PATENT OFFICE.

IRVING W. COLBURN, OF FRANKLIN, PENNSYLVANIA.

GLASS-WORKING APPARATUS.

No. 805,054.      Specification of Letters Patent.      Patented Nov. 21, 1905.

Application filed October 1, 1903. Serial No. 175,375.

*To all whom it may concern:*

Be it known that I, IRVING W. COLBURN, of Franklin, Pennsylvania, have invented a new and useful Improvement in Glass-Working Apparatus, which invention is fully set forth in the following specification.

This invention relates to the art of glass working, and more particularly to the art of drawing glass cylinders designed either for use in cylindrical form or to be split and flattened out to form sheets of glass in ways well known in the art.

In my application, Serial No. 173,865, filed September 19, 1903, I have shown an apparatus for drawing cylinders of glass, which apparatus is provided with means for maintaining the bath of molten glass in the receiving chamber or pot at a constant level as the cylinder is being drawn, which level may be, and preferably is, at the point where the glass would overflow from the pot, and in said application I have shown as a specific means for maintaining said constant level in the receiving chamber or pot a displacement member controlled by the operator of the machine.

My present invention while of the same general design as that described in the application above referred to differs from the same in many important particulars. For example, the constant level or overflow of glass in a trough, chamber, or pot is maintained by compressed air acting to force the bath of molten glass into said pot, and the various exterior and interior cooling devices for the cylinder, the form of the bait for receiving the upper end of the cylinder, and the means for elevating the bait and for feeding the supply of compressed air within the cylinder and circulating medium through the cooling device in said cylinder differ from the construction disclosed in my former application. While the present invention is more specific than that set forth in my application referred to, nevertheless the inventive idea contained in the present invention is capable of receiving a variety of mechanical expressions, some of which are illustrated in the accompanying drawings, forming part of this application, and others which will be included within the scope of the claims appended hereto.

Referring to the drawings, Fig. 3 is an elevational view of the apparatus from the left-hand side of Fig. 1. Fig. 4 is a vertical cross-section, and Fig. 5 a horizontal cross-section, of the interior cooling-ring of the apparatus. Fig. 6 is a vertical sectional view of the compressed-air conduit leading to the interior of the cylinder, together with a valve device for controlling the air-pressure passing therethrough. Figs. 7 and 8 are enlarged views, in vertical section, showing some of the parts in elevation, Fig. 7 showing the delivery-chamber free from air-pressure and the melting glass in the delivery and receiving chambers on a common level, while Fig. 8 shows the levels of the molten glass in the two chambers when compressed air is admitted to the delivery-chamber and the glass is forced to the overflow position in the receiving-pot during the act of drawing a cylinder.

Referring to the drawings, 1 is the melting or refining chamber. 2 is the delivery-chamber, communicating with the refining-chamber 1 through conduit 3, controlled by valve 4, opening into the delivery-chamber 2. This delivery-chamber communicates with the receiving chamber or pot 5 by way of conduit 6, said pot being heated by means of the heating-chamber 7, surrounding said pot, which chamber is in free communication with flue 8, leading to the stack or any other communication with the external atmosphere.

Figures 1, 2:
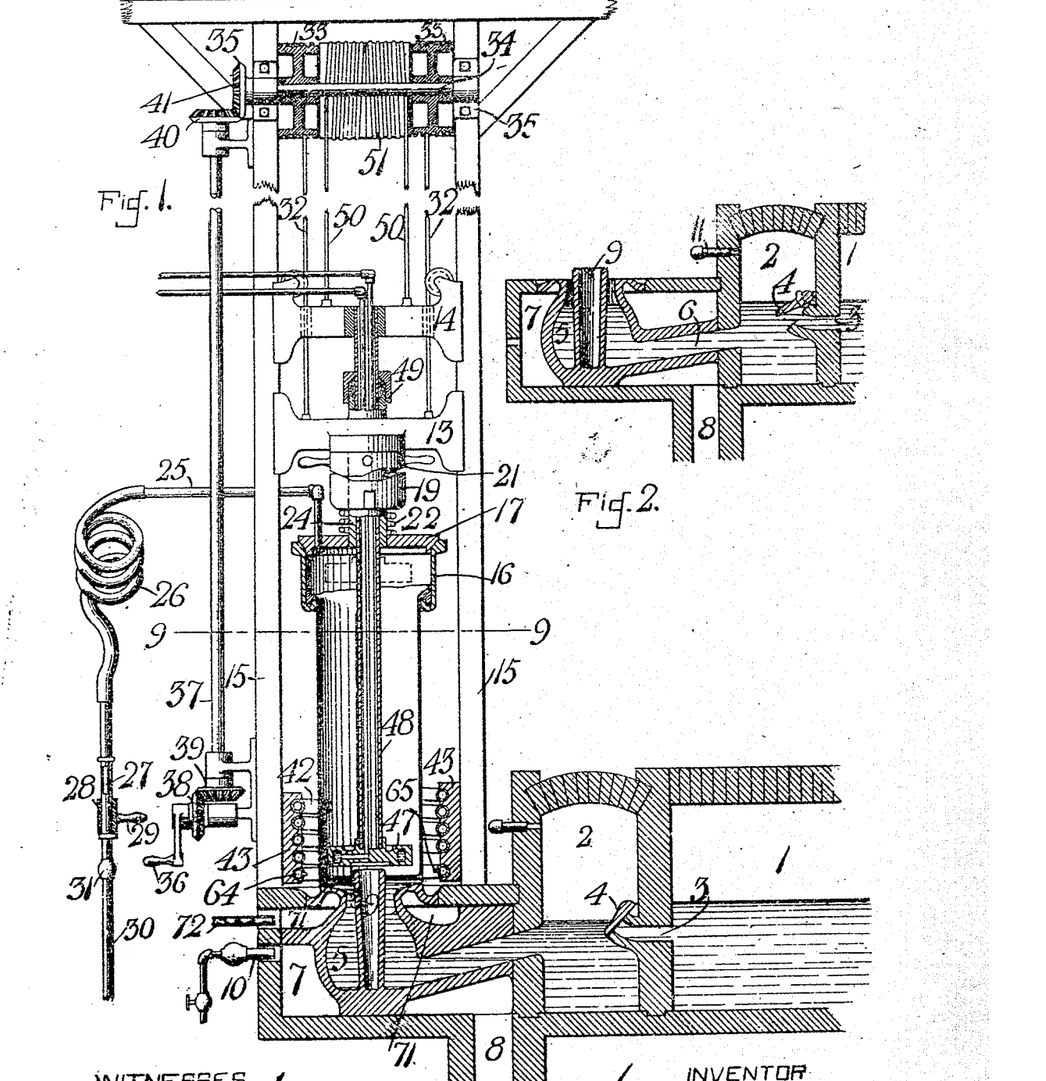
Figure 1 is a partly-sectional and partly-elevational view of the apparatus.
Fig. 2 is a sectional detail showing the molten glass normally occupying the same level in the melting, the delivery, and the receiving chambers.
Figure 7:
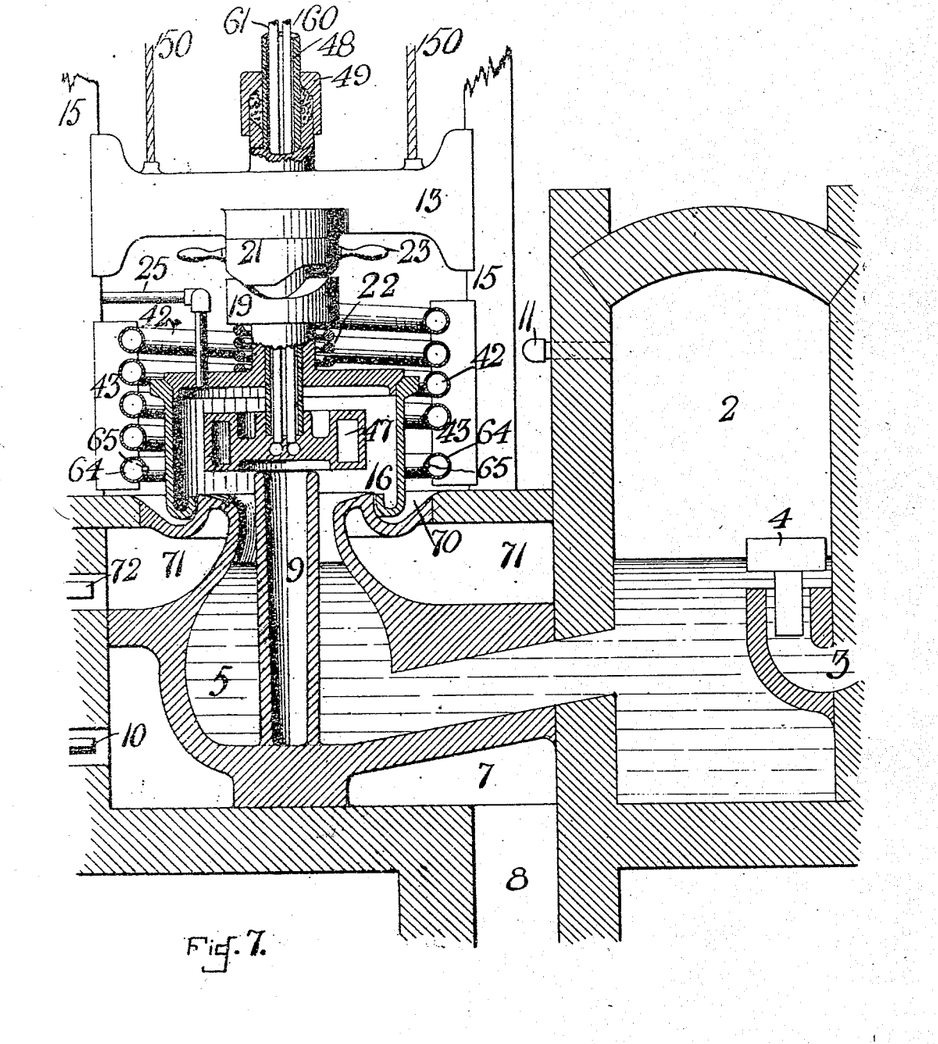
Figure 9:
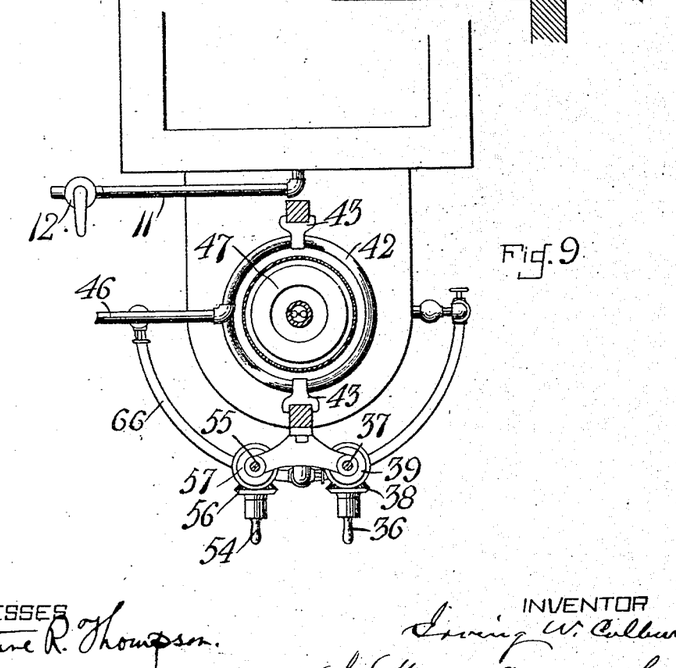
Fig. 9 is a transverse section on the line 9 9, Fig. 1, showing the parts below said line in plan.

Within the pot is a filling-block 9, which may be of any suitable form or construction, here shown as in the nature of a hollow stem tapering from the top downward. The function of this filling-block is to materially diminish the amount of glass required to fill the receiving chamber or pot to overflowing and also to largely diminish the area of the upper surface of the molten glass within the pot, and thereby correspondingly diminish the radiation of heat from said upper surface. This contributes both to the maintenance of the glass in proper condition for working and also prevents the radiation of heat, which would injuriously interfere with the proper manipulation of the cylinder of glass as the same is being drawn. The heating-chamber 7 may be heated in any suitable manner—as, for example, by a series of gas-jets, one of which, 10, is shown in Figs. 1 and 7. For the purpose of supplying air-pressure to the delivery-chamber 2 a pipe 11 (see Figs. 1 and 9) opens into said chamber, said pipe being controlled by a valve 12 in a suitable position to be manipulated by the operator as the cylinder is being drawn.

Referring to Fig. 1, 13 and 14 are cross-heads having vertical movement on upright ways 15 15. The lower one of these cross-heads 13 acts to support the bait 16, which is secured to a bait-plate 17 in any suitable manner so as to form an air-tight joint. One convenient means is by the use of suitable clamps 18 (see Fig. 3) fulcrumed on the bait-plate and having arms connected by links 20 20 to a vertically-moving collar 19, normally held in an elevated position by a spring 22, reacting between said collar and the bait-plate 17. When this collar 19 is depressed, it acts to force the upper arms of the clamps 18 outward, and thereby the lower or clamping jaws of the clamps are forced inward, so as to effectively secure the bait to the clamping-plate 17. The sleeve 19 may be caused to move downward against the extension of the spring 22 by means of a cam-ring 21, located between the sleeve 19 and the cross-head 13, as will be readily understood from an inspection of Figs. 1, 7, and 8. The sleeve 19 and the ring 21 surround a sleeve 24, rigidly secured to the bait-plate 17 and to the cross-head 13, so that the cross-head 13, the bait, bait-plate, and clamping apparatus all move together. The bait-plate 17 is provided with means for admitting compressed air within the cylinders as the same is being drawn, the means here shown being a pipe 25, having a flexible section 26, which connects with a supply-pipe 30 having a stop-cock 31, by which the flow of air may be turned on or off, as desired. In addition to the stop-cock 31 there is provided a valve 28, controlling a vent from the pipe 30 to the atmosphere. The construction of this valve will best be understood from an inspection of Figs. 1 and 6. The valve is in the form of a sleeve 28, having a handle 29, by which the sleeve may be slid up and down over the vent 27, as will be readily understood, the limit of movement of the sleeve being determined by shoulders 62 above and below the said vent. Assuming air at a given pressure to be passing through the supply-pipe 30, a certain portion of the same will be vented through the vent 27, and the amount of pressure passing through the pipe 25 to the cylinder being drawn will be determined by the amount of pressure permitted to escape through the vent 27, and this in turn will be controlled by the elevation of the valve-sleeve 28. If the sleeve be elevated to a position to entirely close said vent, as shown in dotted lines in Fig. 6, it will be evident that the maximum amount of air-pressure will be passing through to the interior of the cylinder being drawn.

Any suitable means may be employed for elevating the bait cross-head 13, and, as here shown, said means consist of ropes or cables 32, attached to the cross-head and passing over drum 33, borne on the shaft 34, turning in bearings 35 upon the upper portion of the guideways 15, which shaft may be operated from any suitable source of power—as, for example, by crank 36, geared to vertical shaft 37 by bevel-gears 38 39, which shaft 37 is in turn geared to the shaft 34 by bevel-gears 40 and 41, all as clearly shown in Fig. 1.

Figure 11:
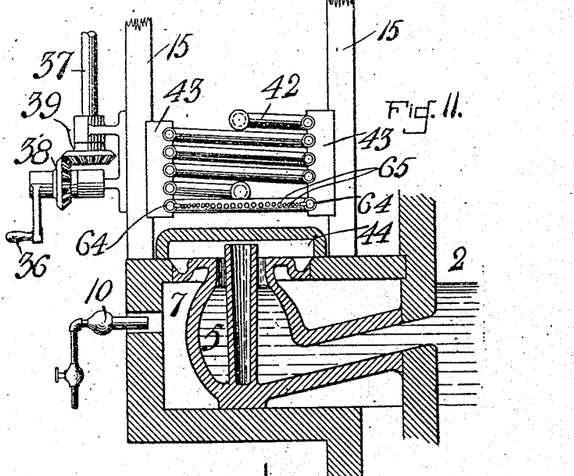
Fig. 11 is a vertical section, showing parts inside elevation, of the delivery chamber or pot and the parts immediately associated therewith and a cover in place over said pot for preventing the radiation of heat therefrom.

In order that the best results may be secured and that glass of proper thickness may be drawn, it has been found necessary to provide cooling apparatus on both the exterior and the interior of the cylinder adjacent to the level of the molten glass where it is drawn from the receiving-chamber 5. The exterior cooling apparatus which it is preferred to employ is best shown in Figs. 1, 7, 8, and 11, wherein 42 represents a coil of pipe for conducting the cooling fluid or medium, which coil is supported in sliding frames 43, which are capable of vertical movement on the ways 15 in order that the cooling apparatus may be elevated when it is found desirable to cover the receiving chamber or pot with a cover 44, as shown in Fig. 11. This coil of pipe is supplied with inlet-pipe 45 and outlet-pipe 46. (Shown in Fig. 3.) In addition to the cooling-coil 42 the frames 43 also support a ring or annular gas-conduit 64, which is provided with inwardly-projecting jets 65, Fig. 1, and connected to a gas-main 66 by a flexible pipe 67 and branch pipe 68, all as clearly shown in Fig. 3.

Figures 3, 4, 5, 6:
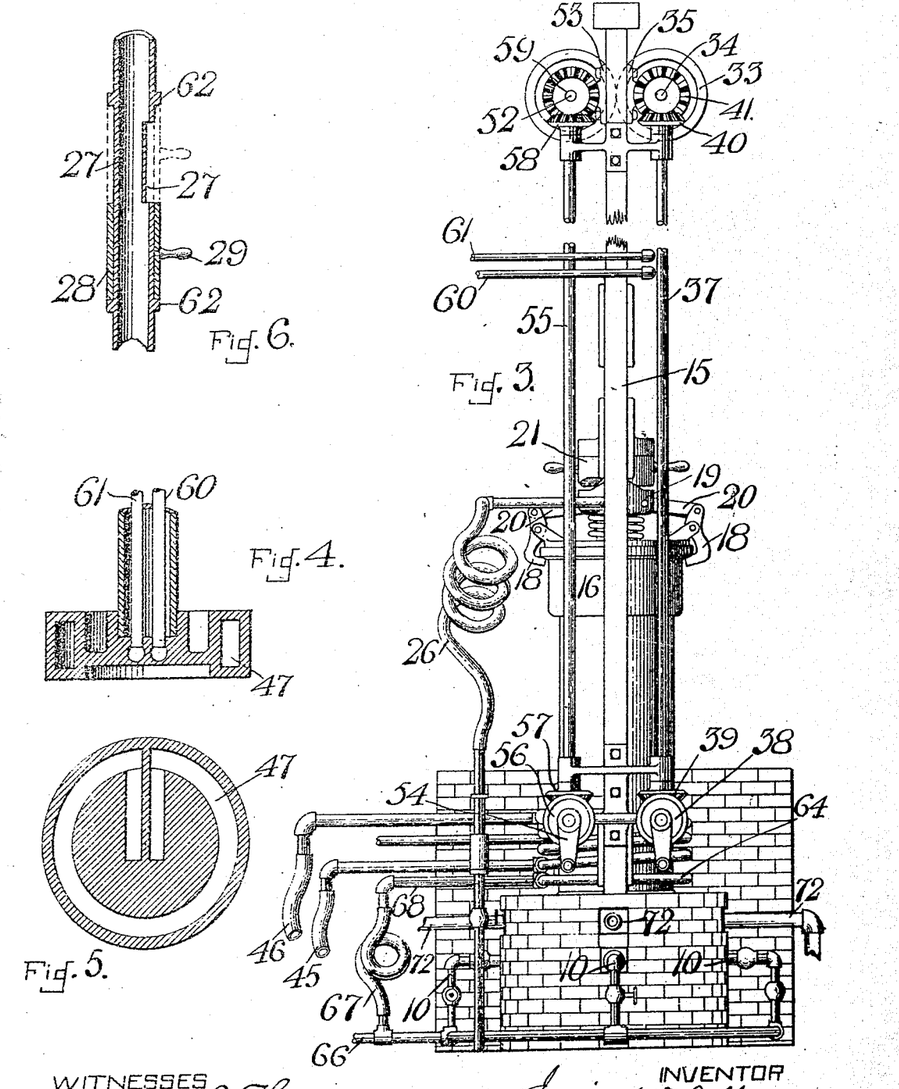

The interior cooling device consists of a cooling ring or chamber 47, Figs. 1, 4, and 5, supported on the end of a tube 48, depending from the cross-head 14 and passing through the cross-head 13 and provided with a stuffing-box 49. This tube 48 is concentric with the sleeve 24, which is supported by the cross-head 13 and in turn supports the bait-plate 17. The stuffing-box 49 prevents the escape of compressed air at the joint between said sleeve 24 and the tube 48 when the cylinder is being drawn and compressed air is being admitted thereto through pipe 25. For the purpose of raising and lowering cross-head 14, carrying with it the cooling-ring 47, cables or ropes 50 are attached thereto and pass over drum 51, supported on shaft 52, having bearings 53 upon the upper portion of the ways 15 15, said shaft being operated to wind the cables 50 on the drum 51 by crank 54, (see Fig. 3,) which operates shaft 55 through bevel-gears 56 57 at one end of said shaft and 58 and 59 at the other end thereof.

The cooling-ring 47 in the present instance is shown in the form of an annular casting; but it might be simply a coil of pipe or any other annular conduit supplied with a cooling medium by means of a conduit 60, the fluid finding exit by way of pipe 61, both of which pipes pass downward through the cross-head 14 and within the tube 48, supporting the cooling-ring 47, as will clearly appear from an inspection of Figs. 1 and 7.

Figure 8:
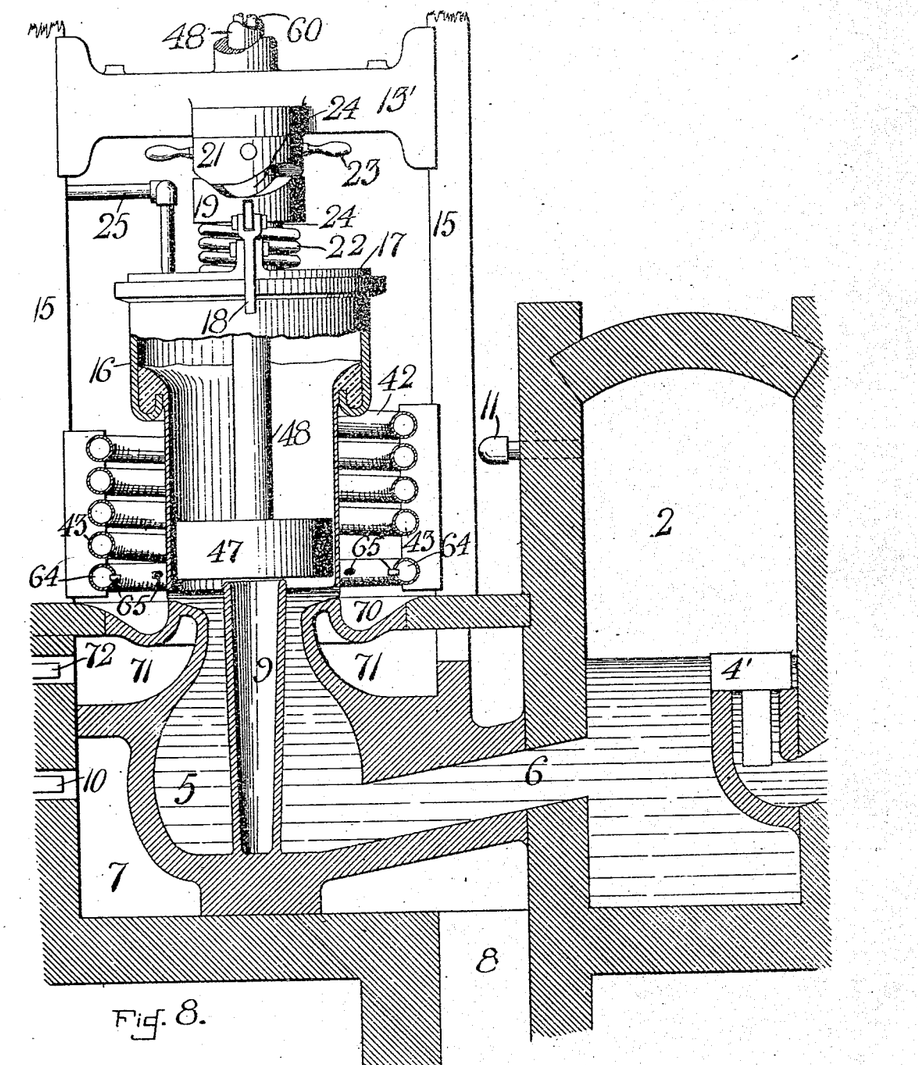

Preferably the receiving chamber or pot 5 is narrowed in at the top, so that when the filling-block 9 is in place there is a very small surface of the molten glass in said receiving chamber or pot exposed, thereby greatly reducing the amount of radiation of heat, and the chamber or pot is provided with an overflow edge or lip, preferably constructed in the manner shown in Figs. 7 and 8—that is to say, with an upward and outward flare 69, terminating in an annular depression or trough 70, which entirely surrounds the overflow-lip and affords a seat for the lower portion of the bait 16, this being particularly advantageous when the lower lip or margin of the bait is of the particular form shown in Figs. 7 and 8.

It has been found in practice that the glass will pull off of the overflow-lip much more readily if the lip is hotter than the glass which is flown over it, and means are therefore provided for heating the said lip to a point somewhat above that of the body or mass of the glass in the receiving chamber or pot. This is accomplished by dividing the heating-chamber around said receiving chamber or pot into upper and lower compartments, the upper compartment 71 of which has its upper wall formed partly by the overflow-lip, and the temperature of the two compartments 71 and 7 of the heating-chamber can be regulated by controlling the supply of fuel through the jets 10, which lead into the chamber 7, and jets 72, which lead into the upper chamber 71, or any other suitable means may be employed for supplying the necessary amount of heat to the two chambers. By thus keeping the upper chamber 71 hotter than the lower chamber 7 the glass which is being forced from the lower portion of the receiving chamber or pot to the upper portion thereof is slightly cooler than the surface of the overflow-lip, and the glass will therefore deliver to the cylinder being drawn with less resistance—that is, it will pull off of the lip easier and decrease the possibility of drawing the glass too thin.

Figures 12, 13:
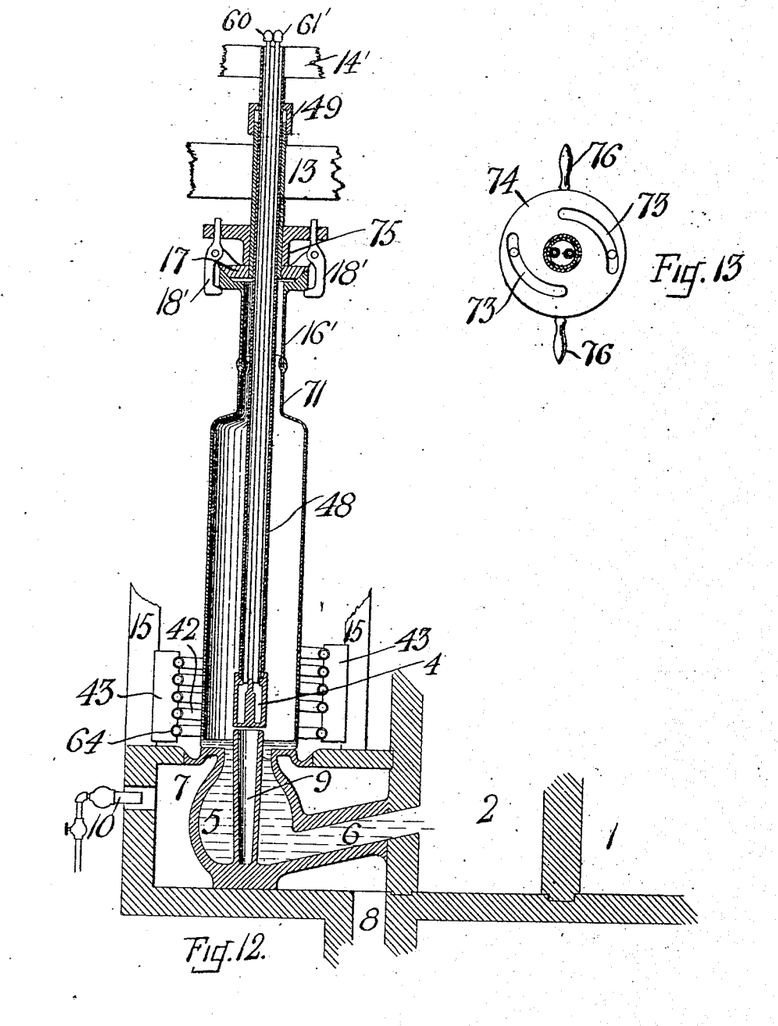
Fig. 12 is a vertical detailed section of a modification.
Fig. 13 is a plan of the bait-clamping apparatus shown in Fig. 12.

While the flaring overflow-lip of the form shown in Figs. 7 and 8 is the one preferred, in some instances it may be found desirable to use an overflow-lip having a substantially horizontal surface of the character shown in Fig. 12, and while the bait may be, and preferably is, large enough to surround the overflow-lip and take seat at the commencement of the operation in the groove 70, as shown in Fig. 7, this is not at all necessary, since the bait may be small enough to enter the mouth of the receiving chamber or pot, if desired, or of any other desired diameter less than that of the exterior diameter of the overflow-lip. Such a construction is illustrated in Fig. 12, wherein the bait 16' of small diameter is clamped to the bait-plate 17 by clamping-hooks 18', having upwardly-projecting arms entering eccentric slots 73 in a plate 74, mounted on a sleeve or bushing 75 and surrounding the tube 48, which supports the cooling-ring 47', which in this case is of much less diameter than that of the cooling-ring 47. (Shown in the other figures.) The plate 74 may be revolved by the operator seizing the handle 76 and in so doing cause the clamps 18' to open or close, depending upon the direction in which the plate 74 is turned. In using a bait of this character the bait is lowered and a cylinder of small diameter is started, after which molten glass from the receiving chamber or pot is caused to flow over the lip or margin of the pot or cylinder, and as it is drawn it is expanded to the desired diameter by means of air-pressure admitted thereinto, as in the other form of the apparatus.

It is not essential that the overflow-lip of the receiving chamber or pot should be in the form of a distinct lip, as it may assume any convenient form which will permit the glass to flow upward, so as to give a surface of greater diameter than that of the interior diameter of the mouth of the receiving chamber or pot. For example, the overflow edge of the receiving chamber or pot may be in the form of an annular ledge 77, Fig. 10, which ledge is caused by slightly depressing the surface of the table immediately surrounding the mouth of the receiving chamber or pot, and it will be readily understood that the bait may be brought into operation with an overflow lip or margin of this character as readily as with the other forms shown.

Operation: Assuming the machine to be at rest with the parts as shown in Fig. 7 and compressed air shut off from the pressure-chamber 2 by valve 12, the molten glass in the melting-chamber, the pressure-chamber, and the receiving-chamber will all be at the same level, as is clearly shown in Fig. 2, the valve 4 opening inward from the delivery-chamber 2 to permit the glass in the melting-chamber to enter said delivery-chamber through the conduit 3 and thence through the conduit 6 to the receiving chamber or pot. The glass in said receiving chamber or pot having been brought to the desired temperature, the cooling-coil 42 and the gas-coil 64 being in the lowermost position, as shown in Fig. 1, and the cooling medium being turned on, so as to circulate through the coil 42, the gas at the jets 65 lighted, but turned low, so as to deliver but little heat, the lower or bait cross-head 13 being in position, so as to permit the bait 16 to surround the overflow-lip of the receiving chamber or pot, as shown in Fig. 7, and the inside cooling-ring being in its lowest position, as shown in Figs. 1 and 7, with cooling medium circulating therethrough and the air-supply being cut off from the pressure-pipe 25, the bait 16 is firmly clamped to the bait-plate 17, so as to form an air-tight joint therewith, and the apparatus is then in readiness to commence to draw the cylinder. The molten glass in the receiving-chamber is now forced over the top of the overflow-lip by admitting compressed air in the chamber 2, the amount of pressure being regulated by the valve 12. The pressure of the air within said chamber will act to close the return-valve 4, controlling the conduit 3, leading from the melting or refining chamber, and the glass will be forced through conduit 6 upward in the receiving chamber or pot and from the overflow-lip 69, where it is caught by the bait 16, whereupon the bait is started on its upward travel by turning the crank 36. Simultaneously with the upward movement of the bait compressed air is admitted into the cylinder at the desired pressure through pipe 25, the pressure being regulated by the slide-sleeve 28, so as to keep the cylinder expanded to the desired diameter. The overflow of molten glass at the overflow-lip may be increased, decreased, or maintained constant at the will of the operator by controlling the amount of pressure passing to the pressure-chamber 2, this pressure being controlled by the regulating-valve 12. When the cylinder has been drawn to the desired length, the pressure in the pressure-chamber 2 is released, thereby permitting the glass in the receiving chamber or pot to drop back to the level of the glass in the delivery-chamber and leaving the cylinder with no more glass to pull from. The bait, continuing its upward movement with its speed accelerated, if desired, and the pressure in the cylinder maintained and, if necessary or desirable, increased in amount, the cylinder will thus be severed from the glass in the receiving chamber or pot. In many cases it may be found desirable to increase the heat around the base of the cylinder by increasing the flame from the jet 65, so as to melt the lower part of the cylinder, and this, with the upward movement of the cross-head 13 accelerated, if desired, and the pressure on the interior of the cylinder will result in a thin film of soft melted glass at the base of the cylinder, which is subjected to internal pressure, thereby causing the soft glass to blow out and detaching the cylinder from the overflow-lip. After the cylinder has thus been severed at the lower end the valve 31 is closed, thus shutting off the pressure of air passing into the cylinder through pipe 25, and the cross-head 13 is raised high enough so that the bottom of the cylinder will clear the cooling-coil 42. The inside cooling-ring 47 is also raised to its highest position by means of the crank 54 operating on drum 51. Any suitable clamp or supporting device being now applied to the bait 16, the clamps which hold it to the bait-plate 17 are released, and the cylinder is carried off by means of tongs or other suitable apparatus forming no part of the present invention and laid horizontally or otherwise on supports, where, if desired, it may be cracked or otherwise freed from the bait by well-known means of cracking off now employed in the art. In the meantime another bait is clamped to the bait-plate 17, and the operation of drawing another cylinder is proceeded with. During any interval between the drawing operations it may be necessary to heat the glass in the receiving-chamber to get it into proper condition for subsequent working, and this is accomplished by raising the frames 43 43, which carry the cooling-coil 42 and the gas-coil 64, and placing the cover 44 over the top of the receiving-chamber, as shown in Fig. 11, thereby preventing the heat from passing out of the top of the receiving-chamber.

Figure 10:
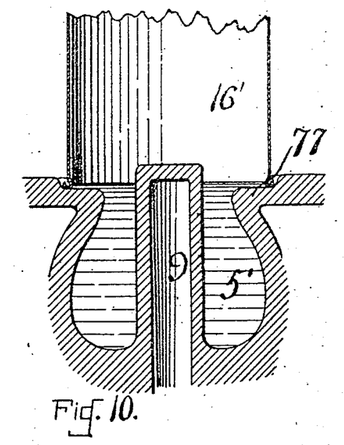
Fig. 10 is a view showing a modification of the upper margin of the delivery chamber or pot.

It will be understood that the filling-block 9 may be open at the top, as shown in most of the figures, or closed at the top, as shown in Fig. 10.

What is claimed is—

1. In a glass-drawing apparatus, the combination of glass-drawing devices, a melting or refining chamber, a receiving chamber or pot, a delivery-chamber intermediate the refining and receiving chambers, means supplying compressed air to the upper part of the delivery-chamber, and a valve controlling the flow of molten glass from the melting-chamber to the delivery-chamber.

2. In a glass-drawing apparatus, the combination of glass-drawing devices, a melting or refining chamber, a receiving chamber or pot, a delivery-chamber intermediate the refining and receiving chambers, means supplying compressed air to the upper part of the delivery-chamber, and a valve automatically controlling the flow of molten glass from the melting-chamber to the delivery-chamber.

3. In a glass-drawing apparatus, the combination of glass-drawing devices, a melting or refining chamber, a receiving chamber or pot, a delivery-chamber intermediate the refining and receiving chambers, means acting under pressure in the delivery-chamber to automatically close communication between said chamber and the melting-chamber, and means supplying compressed air to the delivery-chamber.

4. In a glass-drawing apparatus, the combination of glass-drawing devices, a melting or refining chamber, a receiving chamber or pot, a delivery-chamber intermediate the refining and receiving chambers, means acting under pressure in the delivery-chamber to automatically close communication between said chamber and the melting-chamber, means supplying compressed air to the delivery-chamber, and a device for regulating the tension of the compressed-air supply.

5. In a glass-drawing apparatus, the combination of a chamber or pot for molten glass and having an overflow margin or lip, with means for heating the chamber or pot with its contained charge of glass, and independent means for heating said overflow margin or lip, whereby the margin or lip may be maintained at a higher temperature than the glass within the pot.

6. In a glass-drawing apparatus, the combination of a chamber or pot for molten glass and having an overflow margin or lip, a heating chamber or furnace surrounding the main body of the said pot, and a second heating chamber or furnace for heating the margin or lip, whereby the said margin or lip may be maintained at a higher temperature than the glass within said pot.

7. In a glass-drawing apparatus, the combination of a chamber or pot for the molten glass, a bait for drawing the glass therefrom, and an annular groove or trough surrounding the upper margin or lip of said chamber.

8. In a glass-drawing apparatus, a chamber or pot or receptacle containing molten glass, an annular bait for drawing a cylinder of glass therefrom, a vertically-adjustable cooling device within said cylinder, and vertically-reciprocating supports for said bait and cooling device.

9. In a glass-drawing apparatus, the combination of a pot or receptacle containing molten glass, an annular bait for drawing a cylinder of glass therefrom, a cooling device within said cylinder, a vertically-moving cross-head supporting said bait, another vertically-moving cross-head supporting said cooling device, and guides or ways for said cross-heads.

10. In a glass-drawing apparatus, the combination of a pot or receptacle containing molten glass, a vertically-reciprocating cross-head, a bait-plate carried by said cross-head, a bait removably secured to said plate, guides or ways for said cross-head, and means for moving the cross-head in said ways.

11. In a glass-drawing apparatus, the combination of a pot or receptacle containing molten glass, a vertically-reciprocating cross-head, a bait-plate carried by said cross-head, means admitting compressed air through said plate, a bait removably secured to said plate, guides or ways for said cross-head, and means for moving the cross-head in said ways.

12. In a glass-drawing apparatus, the combination of a pot or receptacle containing molten glass, a bait drawing a cylinder of glass from said pot, an interior cooling-ring, a support for said cooling-ring concentric with said bait, and means independently reciprocating said bait and cooling-ring.

13. In a glass-drawing apparatus, the combination of a pot or receptacle containing molten glass, an annular bait for drawing a cylinder of glass therefrom, a cross-head reciprocating in ways above said pot, a cooling device within said cylinder, a tubular support for said cooling device carried by said cross-head, and inlet and outlet conduits located within said tubular support and leading to and from said cooling device.

14. In a glass-drawing apparatus, the combination of a pot or receptacle for molten glass, an annular cooling device and an annular heating device adjacent to but slightly above the mouth of said pot or receptacle, and vertically-adjustable supports for said cooling and heating devices.

15. In a glass-drawing apparatus, the combination of a pot or receptacle for molten glass, an annular bait for drawing a cylinder of glass therefrom, vertical guideways adjacent to said pot, an interior and an exterior cooling device for said cylinder, said bait and both of said cooling devices being adjustable on said guideways.

16. In a glass-drawing apparatus, the combination of a pot or receptacle for molten glass, an annular bait for drawing a cylinder of glass therefrom, vertical guideways adjacent to said pot, an interior and an exterior cooling device for said cylinder, an exterior heating device, said bait-heating device and both of said cooling devices being adjustable on said guideways.

17. The improvement in glass-working which consists in preparing a mass of molten glass, drawing a cylinder of glass therefrom while maintaining the level of the molten glass approximately constant by applied pressure, then removing the pressure whereby the level of the molten glass is permitted to drop away from the point at which the cylinder is being drawn and severing the bottom of the cylinder by the application of internal pressure.

18. The improvement in the art of glass-working which consists in preparing a mass of molten glass, drawing a cylinder of glass therefrom, maintaining the level of the molten glass approximately constant during the drawing operation by the application of pressure, then withdrawing the pressure, thereby permitting the level of the glass to lower or drop away from the base of the cylinder and severing the base of the cylinder by internal pressure and heat externally applied to the base of the cylinder.

19. The improvement in the art of glass-working which consists in preparing a mass of molten glass, drawing a cylinder of glass therefrom, maintaining the level of the molten glass approximately constant during the drawing of the cylinder, then permitting the level of the molten glass to recede and severing the base of the cylinder therefrom by simultaneously applying internal pressure to the cylinder and heat to the external portion of the base of said cylinder.

20. The improvement in the art of glass-working which consists in preparing a mass of molten glass, drawing a cylinder of glass therefrom while maintaining the surface of the molten glass approximately constant, and then severing the cylinder from the mass of molten glass by lowering the surface of the molten glass and simultaneously increasing the internal pressure within the cylinder and applying external heat to the base of said cylinder.

21. The improvement in the art of glass-working which consists in preparing a mass of molten glass, drawing a cylinder of glass therefrom, maintaining the surface of the molten glass approximately constant during the drawing operation by pressure applied to the molten glass and then severing the base of the drawn cylinder from the base of the molten glass by withdrawing the pressure from said molten glass and simultaneously increasing the internal pressure within the drawn cylinder and applying heat to the external surface of the base of the cylinder.

22. In a glass-furnace, the combination of a melting-chamber, a fluid-pressure chamber, a drawing or gathering chamber, passages connecting the said chambers, to permit the flow of molten glass from one to the other, and fluid-pressure devices for driving the glass into the drawing or gathering chamber, said pressure acting directly upon the molten glass, substantially as specified.

In testimony whereof I have signed this specification in the presence of two subscribing witnesses.

IRVING W. COLBURN.

Witnesses:
  JNO. B. GLENN,
  THOMAS MCGOUGH.